United States Patent [19]

Wakefield, deceased

[11] Patent Number: 4,526,342

[45] Date of Patent: Jul. 2, 1985

[54] ACTUATOR DEVICE FOR A HYDRAULIC SPOOL VALVE

[75] Inventor: Donald C. Wakefield, deceased, late of Grantham, England, by June Wakefield, executrix

[73] Assignee: Kontak Manufacturing Co. Ltd., Grantham, England

[21] Appl. No.: 452,823

[22] Filed: Dec. 22, 1982

[51] Int. Cl.[3] .................... F16K 31/04; F16K 31/54; F15B 13/044

[52] U.S. Cl. .................... 251/131; 137/625.65; 251/133; 251/248

[58] Field of Search .................... 137/625.65; 251/131, 251/133, 248, 250.5; 74/89.18, 89.19, 109; 185/40 B

[56] References Cited

U.S. PATENT DOCUMENTS

| | | | |
|---|---|---|---|
| 1,602,936 | 10/1926 | Reeves | 251/248 X |
| 2,205,512 | 6/1940 | Anderson | 251/248 X |
| 2,503,563 | 4/1950 | Ray | 251/133 X |
| 3,616,820 | 11/1971 | Fleckenstein | 137/624.13 |
| 3,756,282 | 9/1973 | Knutson | 137/625.65 X |
| 4,190,081 | 2/1980 | Coles | 137/625.65 X |
| 4,237,742 | 12/1980 | Barthruff | 74/89.19 |

*Primary Examiner*—Gerald A. Michalsky
*Attorney, Agent, or Firm*—Mason, Fenwick & Lawrence

[57] ABSTRACT

There is disclosed an actuation device for operating a hydraulic spool valve. The device includes a d.c. electric motor and a high-ratio gearbox. The output of the gearbox connects with the spool of the valve through a segmented rack and pitman pin or a rack and pinion arrangement. A control circuit for the electric motor includes position feed-back to permit accurate positioning of the spool. Further, spring means are included to bias the spool to its neutral position in the absence of a control signal or on occurrence of a fail condition.

4 Claims, 3 Drawing Figures

ACTUATOR DEVICE FOR A HYDRAULIC SPOOL VALVE

This invention relates to an actuation device for a hydraulic spool valve.

According to the present invention there is provided an actuation device for a hydraulic spool valve, the device comprising an electric motor, a gearbox having an input driven by said motor and an output connectible to the spool of said valve, and control means for actuating said motor.

Embodiments of the present invention will now be described by way of example with reference to the accompanying drawings in which.

Figure 1:
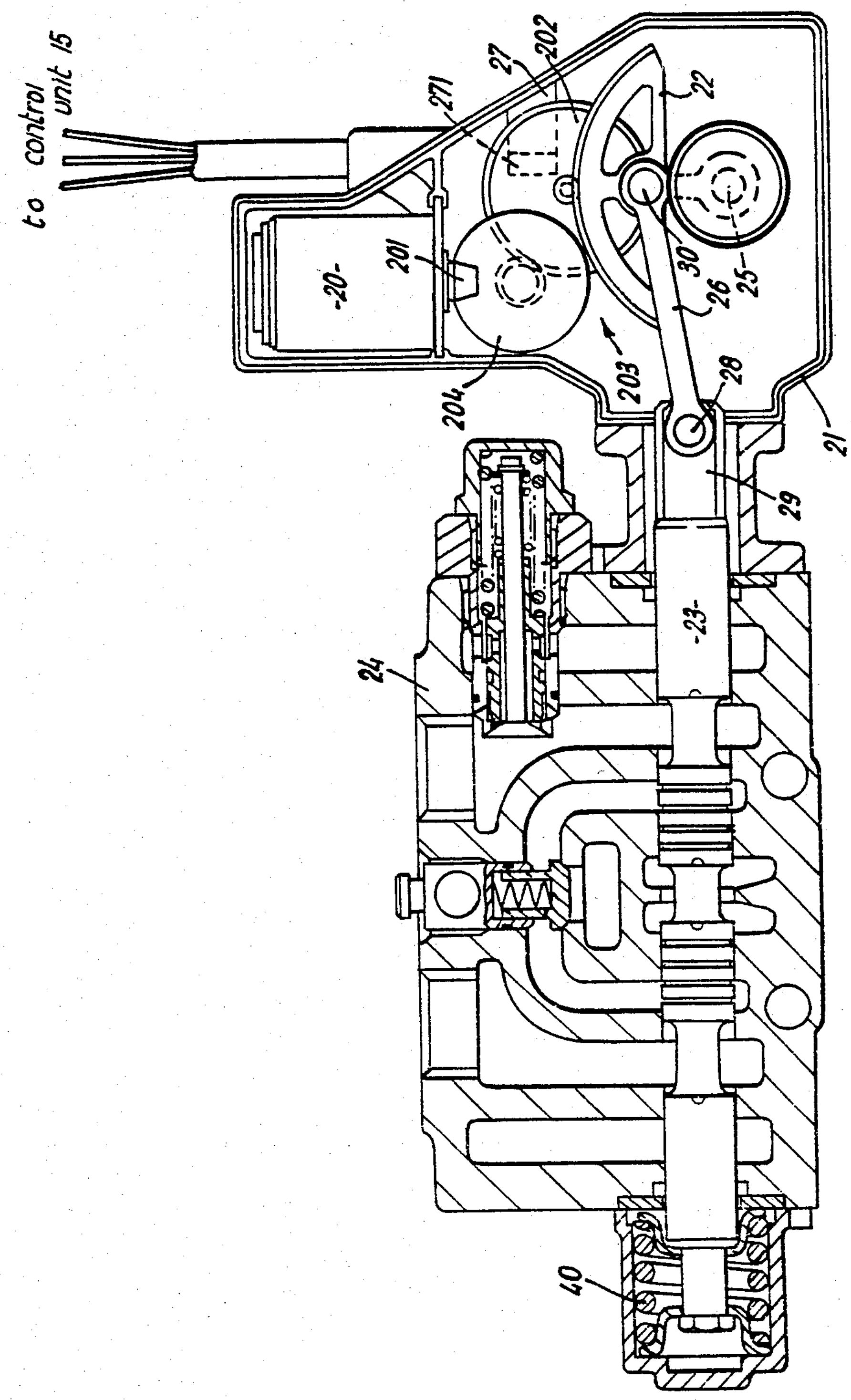
FIG. 1 is a side elevational view in section, showing one embodiment of an actuation device of the present invention fitted to a hydraulic spool valve.

In FIG. 1 of the drawings, an actuation device for a hydraulic spool valve comprises a d.c. electric motor 20 and a gearbox 21. The gearbox 21 has an input pinion 201 which is drivingly connected to an output pinion 202 via a crown wheel 204, the input pinion 201, crown wheel 204 and output pinion 202 meshes with a segmented rack 22 pivotally mounted at 25 in the gearbox 21. A pitman pin 26 is pivotally connected to the segment rack 28 at 30 and is also pivotally connected to an extension 29 of a spool 23 of a hydraulic control valve 24.

In this embodiment, the overall ratio of the gearbox 21 is 478:1. This results in a speed of operation of the spool 23 of about 12 mm/sec at a motor speed of about 3300 r.p.m. For the arrangement shown a maximum force of 250N is required, the segment rack and pitman pin giving a total stroke of 30 mm.

Figure 2:
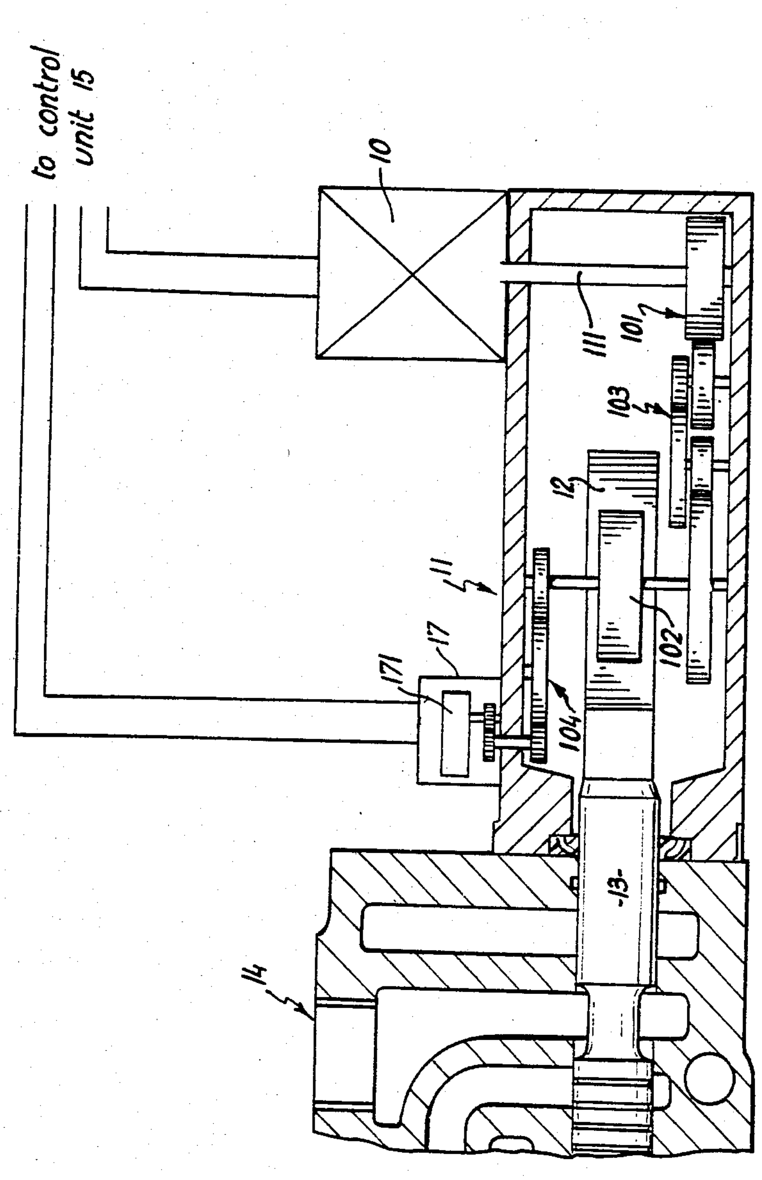
FIG. 2 is a side elevational view, in part section, showing a second embodiment of an actuation device of the present invention fitted to a hydraulic spool valve.
Figure 3:
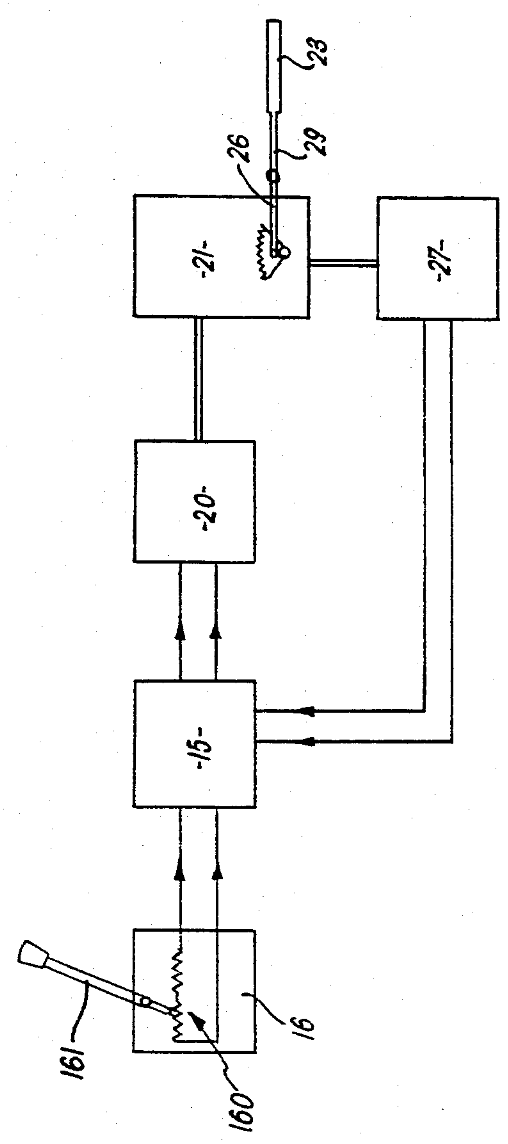
FIG. 3 is a block diagram, schematically illustrating an actuation device made in accordance with the present invention.

In FIG. 2 of the drawings, an actuation device for a hydraulic spool valve comprises a d.c. electric motor 10 and a gearbox 11. The gearbox 10 has an input pinion 101 which is drivingly connected to an output pinion 102 through a plurality of gear wheels forming a gear train 103. The output pinion 102 meshes with a rack 12 forming an extension of a spool 13 of a hydraulic control valve 14. The gear ratio of the gear train is large in order that accurate positioning of the spool valve may be obtained.

For proper working of the device, the operational parameters of the electric motor 10 should fall within specific ranges. More particularly, the motor 10 should have a power output within the range of 2 to 5 watts and be preferably 3 watts.

Also, the rotational speed of the motor 10 should be in the region of 14,500 r.p.m., the overall ratio of the gear train 103 being in the range 400:1 to 1000:1 and preferably 650:1. The resultant linear movement of the rack 12 should be such that the time taken to move the rack 25 mm, which is the stroke of the spool, is in the range of a 0.5 to 4 seconds, and is preferably 2.5 seconds.

In one example, using a 2.5 watt motor, the linear force generated at the spool is approximately 90N, the overall gear ratio being 650:1. Alternatively, using a 5 watt motor and a ratio of 1000:1 the linear force is about 400N. To allow efficient operation, the stall torque of the motor should be in the region of $4\times10^{-4}$ Nm.

The devices of FIGS. 1 and 2 operate as follows

The motor 10, 20 is activated by means of an electrical control unit 15. The control unit 15 receives a position input command from a command unit 16 which may include a rheostat 160 operated by a command lever 161 which may be similar to the direct command lever normally fitted to such hydraulic valves. The command unit 16 passes an electrical signal, representative of the desired position of the spool 13, 23 to the control unit 15 which in turn causes the motor 10, 20 to rotate in a given direction. In FIG. 1, operation of the motor 20 rotates the pinion 201 which, through gear train 203, effects movment of the segmented rack 22 causing the spool 23 to move within the valve 24. The position of the rack 22 is monitored by a feed-back unit 27. In FIG. 2, the rotary motion of the output shaft 111 of the motor is passed through the input pinion 101 and gear train 103 to the gearbox output pinion 102. Rotation of the output pinion 102 results in linear movement of the rack 12 causing the spool 13 to move within the valve 14. Simultaneously, rotation of the output pinion 102 results in rotation of a second gear train 104 forming part of a position feed-back unit 17.

The feed-back unit 17, 27 includes a transducer 171, 271 which gives an output signal representative of the actual position of the rack 12, 22. The signal is compared with the signal representative of the desired position of the rack, and when the two signals are equal, the motor 10, 20 is stopped thus holding the rack in the desired position. Further movement of the command lever results in a difference between the two signals and the motor is activated until balance is again obtained.

In the event of a power loss to the motor 20, the spool 23 is spring biassed to its neutral position by return spring 40 fitted to the spool at its end opposite the extension 29. By virtue of the arrangement of the segmented rack 22 and associated gears, the spring 40 is sufficiently strong to overcome the inertia of the gear train and return the spool to the safe, neutral position.

Preferably, the actuation device of the present invention has a width no greater than the width of the hydraulic valve to which it is to be fitted. In this way, it is possible to provide each valve of a bank of valves with a separate actuator.

Modifications and improvements may be incorporated without departing from the scope of the invention.

What is claimed is:

1. A hydraulic spool valve assembly comprising:
   - a hydraulic spool valve and an actuation device for a spool valve;
   - said actuation device including:
   - an electric motor;
   - control means for actuating said motor;
   - a gear box having an input gear wheel driven by said motor and output means connected to the spool of said valve;
   - wherein said output means comprises a segmented rack and pitman pin, the segmented rack being driven by said input gear wheel and the pitman pin being connected directly to the rack and to the spool valve and connected directly to the spool valve such that rotation of the input gear wheel effects linear movement of the spool valve.

2. An assembly as claimed in claim 1 wherein the motor is a d.c. electric motor.

3. An assembly as claimed in claim 1 wherein said control means includes a position feedback loop.

4. An assembly as claimed in claim 1 and including means for returning the spool to its neutral position.

* * * * *